Dec. 16, 1969     J. F. McCARTHY, JR     3,484,826

IMPACT LANDING SYSTEM

Filed Oct. 18, 1967     3 Sheets-Sheet 1

INVENTOR.
JOHN F. McCARTHY, JR.
BY Allan Rothenberg
ATTORNEY

Dec. 16, 1969  J. F. McCARTHY, JR  3,484,826

IMPACT LANDING SYSTEM

Filed Oct. 18, 1967  3 Sheets-Sheet 2

INVENTOR.
JOHN F. McCARTHY, JR.
BY Allan Rothenberg
ATTORNEY

Dec. 16, 1969 J. F. McCARTHY, JR 3,484,826
IMPACT LANDING SYSTEM
Filed Oct. 18, 1967 3 Sheets-Sheet 3

INVENTOR.
JOHN F. McCARTHY, JR.
BY Allan Rothenberg
ATTORNEY

United States Patent Office 3,484,826
Patented Dec. 16, 1969

3,484,826
IMPACT LANDING SYSTEM
John F. McCarthy, Jr., Downey, Calif., assignor to North American Rockwell Corporation
Filed Oct. 18, 1967, Ser. No. 676,279
Int. Cl. B64g 1/20
U.S. Cl. 244—1                                   12 Claims

ABSTRACT OF THE DISCLOSURE

A vehicle having a lifting surface that is specifically arranged to provide lift and thermodynamic control and protection for the vehicle is provided with a protuberance arranged to extend from a particularly located area of the lifting surface for the purpose of minimizing landing impact loads on the vehicle. The protuberance is located and shaped so that it will first contact the landing surface, generally water. The initial time rate of displacement of the water is minimum, building up to an increased value to thereby provide considerable reduction in peak deceleration and peak pressure.

---

The invention described herein was made in the performance of work under a NASA contract and is subject to the provisions of the National Aeronautics and Space Act of 1958, Public Law 85–568 (72 Stat. 426; 42 U.S.C. 2451) as amended.

Various types of flight vehicles (test vehicles, spacecraft, recoverable satellite, airborne delivery systems, airdropped rescue equipment, and the like) that are built today are recovered by landing at sea. Loads imposed upon such vehicles upon impact with the water are generally high and accordingly have necessitated use of parachutes or other devices to decrease landing velocity and reduce impact to minimize the structural loads upon the vehicle. Nevertheless, despite such deceleration systems, appreciable weight and system complexity are required in design of such vehicles to allow survival of the structure or equipment and occupants of the vehicle upon water impact. A major effort in the construction of such vehicles concerns the general design and arrangement of the vehicle itself to provide a minimum weight but sufficient strength to ensure that impact loads and deceleration levels encountered during the impact do not exceed capacity of either the structure, its equipment or occupants of the vehicle.

For purposes of minimizing detrimental effects of water impact upon recoverable bodies, space vehicles and satellites, primary emphasis has been placed upon aerodynamic deceleration systems or deceleration systems that operate prior to impact and thus minimize terminal velocity of the vehicle. Such systems include parachutes or other aerodynamic drag equipment and downwardly firing rocket devices. Impact upon contents or occupants of the vehicle body generally have been absorbed by various kinds of shock devices such as hydraulic or mechanical struts, crushable structures, or flexible resilient devices such as pneumatic cushions and the like. A device employing frangible tube energy absorption for such a vehicle is described in Patent No. 3,143,321 to J. R. McGehee et al.

In addition to protection of occupants and contents of the vehicle, the vehicle structure itself must be suitably strengthened in order to withstand large pressures and loads. It has been found that although the complete recovery and impact system of such a vehicle may be optimized in its design period to minimize weight and to minimize peak loads, between 10% and 15% of total vehicle weight must, nevertheless, be taken up by the recovery and impact system. Thus in order to avoid loads that might cause rupture of the vehicle or even destruction of the vehicle upon impact, vehicle structure is generally increased with the concomitant weight penalty that is a major disadvantage for such vehicles.

According to a preferred form of this invention, instead of or in addition to impact arrangements that minimize impact energy, absorb energy or change its form, there is provided an arrangement that decreases the rate of application of load to the vehicle upon its landing contact. Thus a landing system is provided to ensure impact loads and deceleration levels within the capacity of both structure and occupants of the vehicle, and yet provides for a minimum of vehicle weight.

Other objects and further advantages of the invention will become apparent from the following detailed description when taken in conjunction with the drawings in which.

Figure 3A:
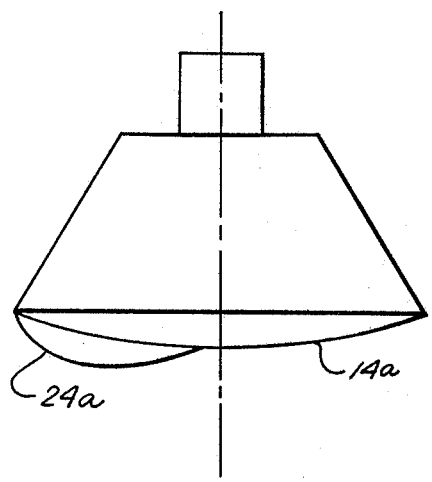
Figure 3B:
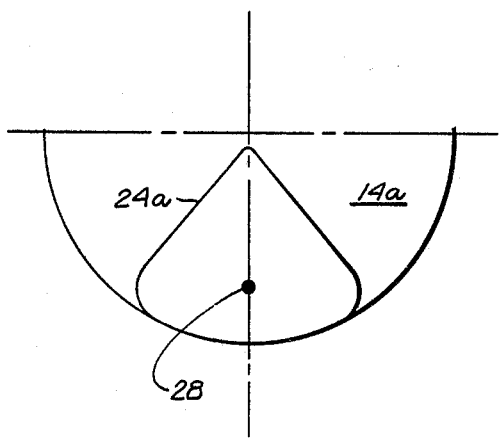
Figure 4A:
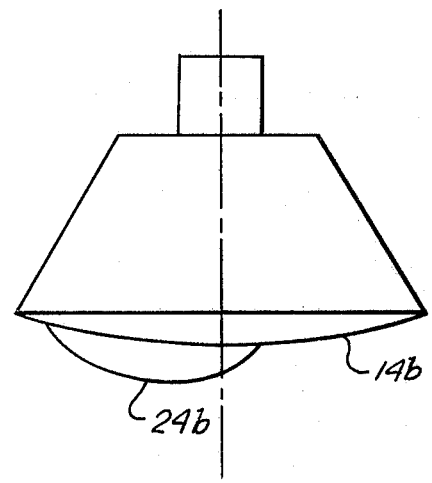
Figure 4B:
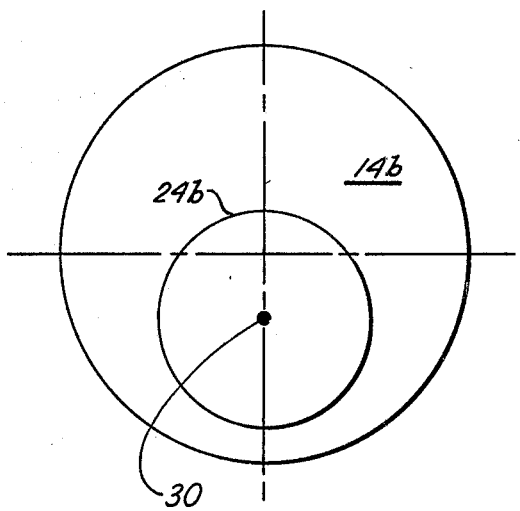
Figure 5:
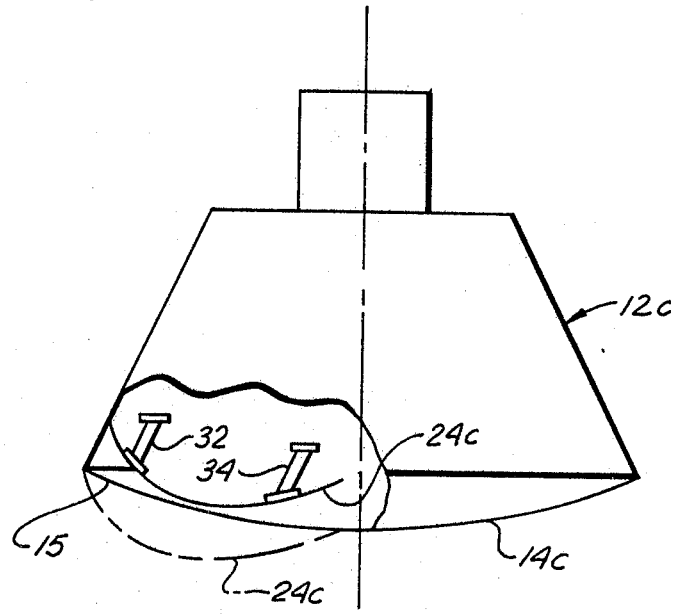
Figure 6:
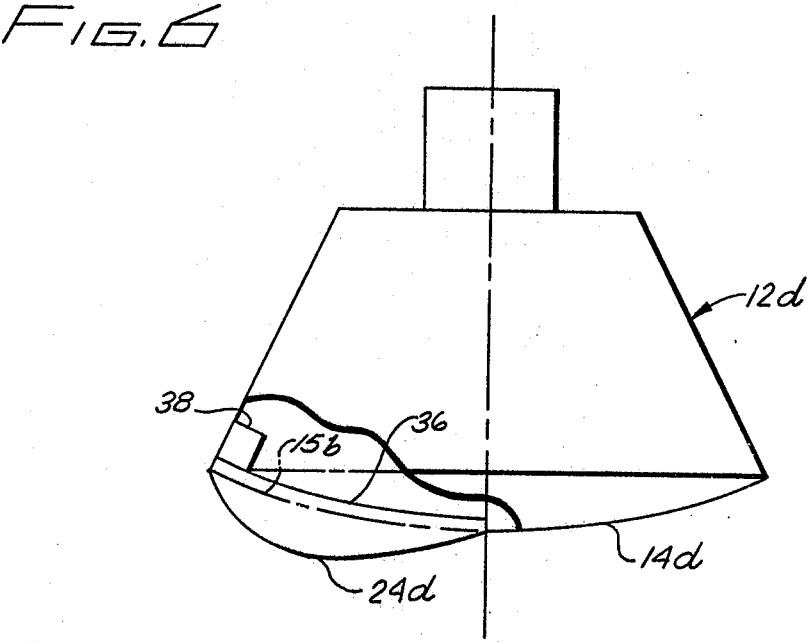

FIGS. 3a, 3b, 4a, and 4b illustrate different configurations and locations of an impact reducing protuberance; and FIGS. 5 and 6 illustrate different forms of deployable impact reducing protuberances.

Throughout the drawings like reference numerals refer to like parts.

Figure 1:
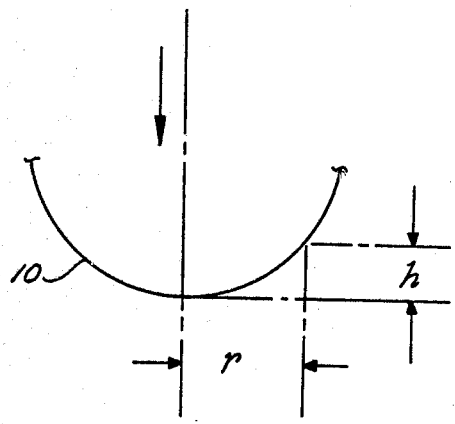
FIG. 1 illustrates certain geometrical principles involved with the invention.

For a theoretical analysis of the principle upon which the present invention is based, consider the impact of a body of revolution on landing in water, although it will be readily appreciated that the results to be derived will be applicable to bodies of other shapes. A body of revolution considered herein, for purposes of this theoretical discussion, is assumed to be descending vertically at an initial speed $V_0$. Such a body may have a configuration as illustrated at 10 in FIG. 1. After the vehicle has penetrated the water to a depth $h$, as indicated in FIG. 1, its speed has been reduced by some magnitude to a speed $V$. The original momentum of the vehicle, $MV_0$ is now shared by the vehicle's momentum $MV$ and the momentum imparted to the water. According to hydrodynamic theory the momentum imparted to the water can be written as $k\rho r^3 V$, where $r$ is the maximum radius of the immersed portion of the vehicle, $\rho$ is the mass-density of the displaced water and $k$ is a numerical factor which lies in the range of $4/3$ to $2/3\pi$. Employing the principle of the conservation of momentum, we can write:

$$MV_0 = MV + k\rho r^3 V$$

which may be written as:

$$V = V_0 \Big/ \left(1 + \frac{k\rho r^3}{M}\right)$$

Considering $K$, $\rho$, $M$ and $V_0$ as constants and differentiating this expression to get the load on the vehicle due to impact, $F$, we get:

$$F = -M\frac{dV}{dt} = \frac{V_0 3k\rho r^2}{\left(1 + \frac{k\rho r^3}{M}\right)^2} \cdot \frac{dr}{dt}$$

$$\frac{dr}{dt} = \frac{dr}{dh} \cdot \frac{dh}{dt} = \frac{dr}{dh} \cdot V = \frac{dr}{dh} \cdot \frac{V_0}{\left(1 + \frac{k\rho r^3}{M}\right)}$$

It will be seen that:

$$F = \frac{3k\rho V_0^2 r^2}{\left(1 + \frac{k\rho r^3}{M}\right)^3} \cdot \frac{dr}{dh}$$

and the average pressure, $p$, on the immersed portion of the vehicle is equal to F divided by $\pi r^2$. Thus we get:

$$P = \frac{F}{\pi r^2} = \frac{3k\rho V_0^2}{\left(1 + \frac{k\rho r^3}{M}\right)^3} \cdot \frac{dr}{dh}$$

This equation reveals that both the total impact load F and pressure $p$ depend inversely upon the slope of the vehicle at the water line $dh/dr$.

From cosideration of this theory it will be readily appreciated that an increase in the slope $dh/dr$ (i.e. making the local surface more nearly perpendicular to the impact surface) will reduce both loads and pressure. Further application of this theory, by integrating the above equations, enables determination of shape and dimensions of a protuberace for given conditions to result in a predetermined load-time or pressure-time, or load-area or pressure-area history.

Illustrated in FIG. 2 is a spacecraft 12 incorporating pjrinciples of this invention. The spacecraft has an impact or leading surface 14 that is arranged to provide aerodynamic lift and braking upon reentry and also includes provision for thermodynamic control to dissipate heat generated upon high speed travel through the atmosphere. A spacecraft of this type is generally provided with deployable aerodynamic braking devices or a parachute cluster (not shown) that are operable within the atmosphere to provide for deceleration of the vehicle upon landing. Such a vehicle is generally adapted for landing upon water, but must also be designed for landing on land in an emergency. During descent the vehicle central axis 16 is arranged and the vehicle is suspended from its parachutes so as to be at the indicated angle with respect to the vertical, indicated at 18. It will be seen then that the vehicle during descent generally has a landing velocity vector indicated at 20 having both a horizontal component and a vertical velocity component directed substantially along the vehicle axis 22. With such an arrangement the vehicle upon descent with a component of horizontal velocity as shown at 20 will tumble as it impacts, thus decreasing loads and pressures. It will be apparent that the impact surface or vehicle leading surface 14 has a relatively small curvature and extends at a substantially large angle, nearly 90°, with respect to the axis 22 of the vehicle during landing.

Following the principles described above, the slope of the vehicle landing surface shortly after impact, when the maximum loads and deceleration occur, is considerably increased by provision of a protuberance 24 on a relatively small portion of the impact surface 14. The protrusion 24, as may be seen in FIGS. 2a and 2b, has a point of peak extension from the impact surface 14 at 26 and curves smoothly from such extension peak into the remainder of the surface 14 along a line of intersection with such surface which is generally of the teardrop shape indicated in the bottom view of FIG. 2b.

Figure 2A:
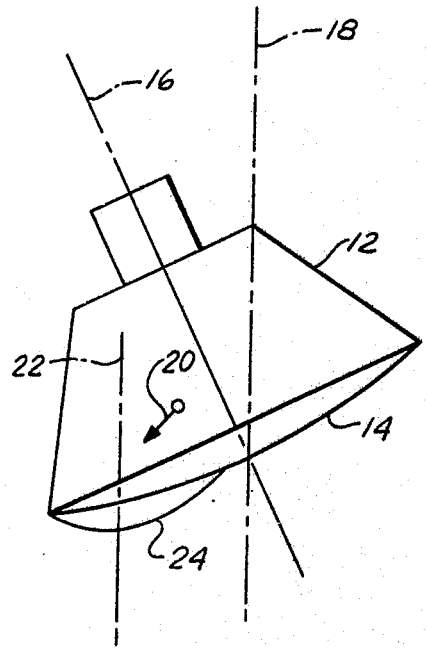
FIGURES 2a and 2b show a first embodiment of a vehicle incorporating the invention.
Figure 2B:
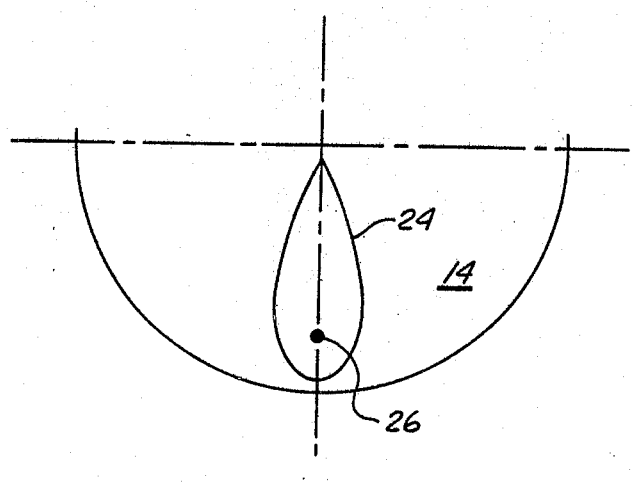

For use with a vehicle wherein the radius of curvature of impact surface 14 is nominally 15 feet and a maximum transverse chord subtending the periphery of surface 14, as indicated in FIG. 2a, is somewhat less than 13 feet, a preferred protuberance 24 will have a longitudinal extent or maximum dimension along its greatest longitudinal axis of 6 feet and a width along the transverse direction of 3 feet. Thus the indicated protuberance has a peak that is asymmetrically located with respect to the impact surface 14 and is displaced from the center of such surface. With this arrangement the first portion of the vehicle to impact with the water surface is the protrusion which has an increased slope as compared with the impact surface 14. Thus as indicated above, the increased slope reduces both impact load F and pressure $p$. The volumn of water displaced immediately following impact does not increase as rapidly as it would without the protuberance. Since the load imposed upon the vehicle and hence the deceleration experienced by the vehicle and contents, depend upon the speed with which water is displaced, the protuberance effectively reduces pressures, loads and decelerations experienced by the vehicle. The protuberance is shaped so that its cross-sectional area increases steadily with depth and is preferably constructed of a suitable rigid lightweight material such as fibreglass honeycomb, plastic foam, aluminum or other metal truss grid honeycomb. Such material will provide substantially improved land landing capability by absorbing appreciably more energy in crushing upon impact. Alternatively it may be fabricated using other conventional structures although greater weight penalties may be involved. For uses involving the high heating rates of reentry, thermal protection may be provided by covering the aerodynamically exposed surface of the protuberance and the rest of the leading surface 14 with suitable ablative or insulative material.

The protuberance may be formed as an integral portion of the leading surface 14 or it may be attached thereto by bonding to the external surface or by mechanical means such as screws, bolts, rivets, welding or the like.

Illustrated in FIGS. 3 and 4 are alternative configurations and locations of the protuberance. FIG. 3a and FIG. 3b illustrate a protuberance 24a that is substantially triangular in plan view, as viewed from the underside of the descending vehicle, and thus provides a greater area and perimeter of protuberance at a more forwardly advanced portion of the vehicle. In the arrangement of FIGS. 3a and 3b the peak of the protuberance, the peak of maximum displacement from the remainder of the leading surface, as indicated at 28 is displaced considerably forward of the center of the leading surface 14a.

In the arrangement illustrated in FIGS. 4a and 4b the protuberance again is asymmetrically located with respect to the rest of the leading surface 14b and has a peak 30 that is forwardly displaced in the direction of the lowest part of the vehicle as described above in connection with the other configurations. The protuberance of FIGS. 4a and 4b intersect the leading edge surface along a substantially circular line.

It will be readily appreciated that a number of variations of the described protuberance may be employed without departing from the principles of this invention. For example, the protuberance may comprise an inflatable device mounted on the impacting vehicle surface and arranged for inflation only after reentry. With such an arrangement the reentry configuration may be chosen entirely by aerodynamic and thermodynamic factors. These need be compromised to a minimum for purposes of impact consideration. Alternatively the protuberance may be made of rubber, plastic or other suitable material and may be inflated, for example, at some point during descent on a parachute system, as more particularly described below. Inflation may be effected by compressed gas, gas generator or by foaming plastic. Rigidity of such inflatable device may be obtained by performing inflatable material, by providing internal cable or wire supports or by filling with a foam that may become rigid in the interval between inflation and impact. Still other variations include arrangements for mechanically deploying the protuberace, which accordingly would be retracted inside the vehicle during normal operations.

At some appropriate time such as immediately prior to impact, the protuberance may be deployed on mechanical struts or pivoting links so as to provide the desired impact loading reduction. Such an arrangement is illustrated in FIG. 5 wherein a spacecraft 12c has a leading surface or impact surface 14c including a portion 15 that is adapted to be selectively removable as by operation of quick-release connectors, explosive bolts or the like (not shown). Mounted upon and within the vehicle for deployment through the portion of leading surface 14c after separation of detachable portion 15 is a rigid protrudable surface 24c. The protrusion surface 24c is mounted in the vehicle by means of telescoping extendable and mechanically deployable assemblies 32 and 34 which, after extension, may be rigid, or may be of the type more particularly described in the aforementioned Patent No. 3,143,321. These extensible assemblies are deployed by gravity upon separation of the leading surface portion 15 or may be mechanically deployed by any suitable means. Energy absorption at landing on land can be effected by crushing of the protuberance 24c. Alternately, the assemblies 32, 34 may include energy dissipating or shock absorbing arrangement as more particularly described in the aforementioned patent to provide additional impact protection where deemed necessary or desirable.

It will be readily appreciated that any number of extensible struts may be employed although but two are shown. Alternatively the mechanically deployable protrusion 24c may be mounted upon swingable linkages rather than the telescoping assemblies shown.

As indicated in FIG. 6 the protrusion, in another embodiment, may take the form of an inflatable or flexibly extensible member 24d carried within a detachable portion of the leading or impact surface 14d of a spacecraft 12d. In such an arrangement the flexible and extendable protrusion 24d is carried during normal operations within the spacecraft between a plenum member 36 that is relatively rigid and a detachable surface portion, indicated in dotted lines at 15b. Mounted within the spacecraft, and in fluid communication with the interior of the chamber formed by plenum 36, is a container 38 filled with foaming materials that expand and rigidify upon release from the container. Suitable valve means, not shown, are arranged to be operated to release the foaming material for expansion between plenum 36 and the protrusion surface 24d, whereby the latter is expanded and rigidified for impact load alleviation.

In comparative tests where bodies were impacted upon various configurations of protuberances, as illustrated in the drawings, and also upon spherically shaped surfaces lacking protuberances, significant reductions in peak deceleration and peak loads were indicated. In these tests vertical and horizontal components of velocity and orientation of the vehicle at the moment of impact in pitch, yaw and roll were varied within ranges that might be expected to be encountered in normal operation. The percentage reduction that was found in peak deceleration (corresponding to percentage reduction in peak impact loads) averaged, over various test conditions, to be 20% for the configuration of FIG. 2, 35% for the configuration of FIG. 3 and 64% for the configuration of FIG. 4.

In additional comparative tests made at various velocity and orientation conditions considered to be critical for impact loads, the protuberance configuration of FIG. 2 was compared to that of a similar vehicle with no protuberance. It was found that peak decelerations were decreased by 35% with this protuberance and peak pressure was decreased by as much as 64% for critical velocity and orientation conditions.

It will be seen that the described protuberance configuration and arrangement of vehicle impact surface provides an appreciable reduction in impact loads and a considerable reduction in peak value of local pressures with a minimum increase in weight. Thus significant reductions in vehicle weight may be made without compromising impact capacity of the vehicle for water landing and increasing the impact capacity for land landing.

What is claimed is:

1. A spacecraft adapted to enter the earth's atmosphere at great velocity and to approach a landing area with a velocity component that is normal to said area and extends along a predetermined axis thereof comprising:

a leading surface on the spacecraft comprising a heat shield constructed and arranged for aerodynamic and thermodynamic control of the spacecraft during entry into the atmosphere, said surface extending substantially normal to said axis and having a protruding portion extending therefrom and continuous therewith, said protruding portion having a surface that forms a relatively small angle with said axis.

2. The vehicle of claim 1 wherein said leading surface is generally circular and said protuberance meets the leading surface along a curve that is generally circular.

3. The vehicle of claim 1 wherein said leading surface is generally circular and said protuberance meets the leading surface along a curve that is generally triangular.

4. The vehicle of claim 1 wherein said leading surface is generally circular and said protuberance meets the leading surface along a curve that is generally tear-drop shaped.

5. The vehicle of claim 1 wherein said protuberance is oriented symmetrically but positioned asymmetrically about said predetermined axis with respect to said leading surface.

6. A water landing system for a spacecraft having a relatively blunt heat shield with a relatively small curvature comprising:

a protuberance extending from the heat shield and having a curvature substantially greater than the curvature of said heat shield, said protuberance extending over a relatively small portion of the area of said heat shield.

7. The structure of claim 6 above wherein said heat shield is substantially circular and has a continuous curvature that provides substantially all of the aerodynamic lift of the vehicle, said protuberance being forwardly displaced from the center of said heat shield.

8. The structure of claim 6 wherein said protuberance includes means carried with the vehicle for selective extension therefrom.

9. The structure of claim 8 wherein said means includes a relatively rigid structure and means mounting the structure to the vehicle for mechanical deployment from said impact surface.

10. The structure of claim 8 wherein said means includes a relatively flexible structure and means for expanding and rigidifying said flexible structure including an expandable foaming plastic.

11. The structure of claim 6 wherein said protuberance comprises a crushable energy absorbing honeycomb structure.

12. A spacecraft of generally truncated conical configuration having a heat shield on one surface thereof, said heat shield being of circular configuration and formed with a relatively small continuous curvature for providing lift on the spacecraft during entry into the earth's atmosphere and providing protection against reentry heating, and means for decreasing impact load rates on the spacecraft during water landing, said means comprising a protuberance fixed to the heat shield and extending over a relatively small area thereof, said protuberance having a peak of maximum curvature greater than the curvature of said heat shield and being asymmetrically located with respect to the circular configuration heat shield.

References Cited

UNITED STATES PATENTS

| | | | |
|---|---|---|---|
| 2,228,860 | 1/1941 | Von Schlippe | 244—105 |
| 2,898,058 | 8/1958 | Del Mar | 244—138 X |
| 2,944,771 | 7/1960 | Bush | 244—100 |
| 2,961,204 | 11/1960 | Rayfield et al. | 244—138 |
| 2,973,172 | 2/1961 | Bixby | 244—138 |
| 3,010,540 | 11/1961 | Dahlen | 244—138 X |
| 3,029,046 | 4/1962 | Blaes et al. | 244—105 |
| 3,090,580 | 5/1963 | Kehlet et al. | 244—113 X |
| 3,143,321 | 8/1964 | McGehee et al. | 244—100 |
| 3,301,507 | 1/1967 | Mayo et al. | 244—1 |

MILTON BUCHLER, Primary Examiner

P. E. SAUBERER, Assistant Examiner

U.S. Cl. X.R.

244—3.1, 105